US 11,708,106 B2

United States Patent
Fay, II et al.

(10) Patent No.: US 11,708,106 B2
(45) Date of Patent: Jul. 25, 2023

(54) STEERING SYSTEMS AND METHODS USING ACTIVE BRAKING

(71) Applicant: CNH Industrial America LLC, New Holland, PA (US)

(72) Inventors: Jeffrey Brown Fay, II, Oxford, PA (US); Nicholas Gregory, New Holland, PA (US); Zachary Stephens, Howard, PA (US)

(73) Assignee: CNH Industrial America LLC, New Holland, PA (US)

(*) Notice: Subject to any disclaimer, the term of this patent is extended or adjusted under 35 U.S.C. 154(b) by 1016 days.

(21) Appl. No.: 16/459,738

(22) Filed: Jul. 2, 2019

(65) Prior Publication Data

US 2021/0001923 A1 Jan. 7, 2021

(51) Int. Cl.
*G06F 17/00* (2019.01)
*B62D 9/00* (2006.01)
*B60W 10/20* (2006.01)
*B62D 11/08* (2006.01)
*B62D 11/04* (2006.01)
*B62D 11/00* (2006.01)
*B60T 8/1755* (2006.01)

(52) U.S. Cl.
CPC ............ *B62D 9/002* (2013.01); *B60T 8/1755* (2013.01); *B60W 10/20* (2013.01); *B62D 11/003* (2013.01); *B62D 11/04* (2013.01); *B62D 11/08* (2013.01); *B60T 2250/00* (2013.01); *B60T 2260/02* (2013.01)

(58) Field of Classification Search
CPC ...... B62D 9/002; B62D 11/003; B62D 11/04; B62D 11/08; B60T 8/1755; B60T 2250/00; B60T 2260/02; B60T 11/21; B60T 13/662; B60W 10/20
USPC ......................................... 188/254
See application file for complete search history.

(56) References Cited

U.S. PATENT DOCUMENTS

| | | | |
|---|---|---|---|
| 4,914,592 A | 4/1990 | Callahan et al. | |
| 5,301,617 A * | 4/1994 | Miwa | B62D 1/28 180/6.24 |
| 7,530,921 B2 * | 5/2009 | Fackler | A01D 75/18 477/96 |
| 7,544,147 B2 * | 6/2009 | Strasser | B60T 13/66 477/96 |
| 7,630,807 B2 * | 12/2009 | Yoshimura | B60K 6/46 701/36 |
| 7,798,272 B2 | 9/2010 | Pruitt et al. | |
| 7,930,843 B2 | 4/2011 | Hartwick | |
| 8,108,109 B2 | 1/2012 | Young et al. | |
| 8,645,022 B2 * | 2/2014 | Yoshimura | B60L 15/2009 701/32.8 |
| 8,974,011 B2 * | 3/2015 | Schick | B60T 8/4827 303/116.1 |
| 9,074,347 B2 * | 7/2015 | Vigholm | F15B 21/14 |

(Continued)

*Primary Examiner* — Ronnie M Mancho
(74) *Attorney, Agent, or Firm* — Peter K. Zacharias

(57) ABSTRACT

A differentially steered vehicle includes brakes on the powered wheels which are applied via a controller according to different methods to inhibit freewheeling during turns and improve steering responsiveness and stability. The methods include applying braking force to the wheel on the inside of a turn in response to the rate of turn as indicated by the position of the steering control, to the pressure differential across the hydraulic motors driving the wheels and the rotational speed of the wheels.

17 Claims, 5 Drawing Sheets

(56) References Cited

U.S. PATENT DOCUMENTS

| | | | | |
|---|---|---|---|---|
| 9,415,643 B2* | 8/2016 | Lammers | ............ | B60C 23/0416 |
| 9,650,038 B2* | 5/2017 | Yoshimura | ............ | B60W 10/18 |
| 9,694,849 B2 | 7/2017 | Kuras et al. | | |
| 9,863,445 B2* | 1/2018 | Barr | ............ | E02F 9/2275 |
| 10,260,627 B2* | 4/2019 | Lacher | ............ | E02F 9/2203 |
| 10,279,643 B2* | 5/2019 | Fay, II | ............ | B60G 17/0152 |
| 10,421,484 B2* | 9/2019 | Fay, II | ............ | B60B 33/025 |
| 10,457,263 B2* | 10/2019 | Miller, Jr | ............ | B60T 17/221 |
| 10,464,602 B2* | 11/2019 | Fay, II | ............ | B60K 17/10 |
| 10,485,174 B2* | 11/2019 | Fay, II | ............ | B60G 21/073 |
| 11,026,368 B2* | 6/2021 | Fay, II | ............ | A01B 73/00 |
| 11,129,331 B2* | 9/2021 | Young | ............ | B62D 7/159 |
| 2005/0177291 A1 | 8/2005 | Strashny et al. | | |
| 2007/0015626 A1* | 1/2007 | Strasser | ............ | B60T 7/085 |
| | | | | 477/96 |
| 2007/0015628 A1* | 1/2007 | Fackler | ............ | A01D 75/18 |
| | | | | 477/99 |
| 2010/0030421 A1* | 2/2010 | Yoshimura | ............ | B60L 15/2009 |
| | | | | 701/31.4 |
| 2012/0067432 A1* | 3/2012 | Vigholm | ............ | E02F 9/2217 |
| | | | | 137/488 |
| 2014/0110998 A1* | 4/2014 | Schick | ............ | B60T 11/21 |
| | | | | 303/116.1 |
| 2014/0188343 A1* | 7/2014 | Yoshimura | ............ | B60W 10/08 |
| | | | | 701/41 |
| 2014/0357446 A1* | 12/2014 | Pierce | ............ | B62D 5/093 |
| | | | | 477/1 |
| 2015/0100207 A1* | 4/2015 | Yoshimura | ............ | B60W 30/00 |
| | | | | 701/1 |
| 2015/0247511 A1* | 9/2015 | Barr | ............ | E02F 9/226 |
| | | | | 137/571 |
| 2017/0268516 A1 | 9/2017 | Oppermann et al. | | |
| 2018/0186207 A1* | 7/2018 | Fay, II | ............ | F16F 1/00 |
| 2018/0229570 A1* | 8/2018 | Fay, II | ............ | B60G 21/073 |
| 2018/0229571 A1* | 8/2018 | Fay, II | ............ | B60G 17/0565 |
| 2019/0002017 A1* | 1/2019 | Fay, II | ............ | B62D 5/26 |
| 2019/0002023 A1* | 1/2019 | Fay, II | ............ | B62D 11/04 |
| 2020/0163278 A1* | 5/2020 | Fay, II | ............ | B60B 33/04 |
| 2020/0164917 A1* | 5/2020 | Fay, II | ............ | B62D 5/06 |

* cited by examiner

STEERING SYSTEMS AND METHODS USING ACTIVE BRAKING

FIELD OF THE INVENTION

The invention concerns steering and braking systems for differentially steered vehicles.

BACKGROUND

Vehicles, such as harvesters, which are differentially steered (i.e., steered by turning a wheel on one side of the vehicle faster than a wheel on the opposite side) can suffer from delayed reaction to operator input steering commands. The delay is especially apparent for hydraulic power trains which display an inherent lag between when the steering command is given and when the wheels attain the commanded differential speeds and begin executing the turn. As a wheel is slowed, which occurs with the wheel on the inside of the turn, it will experience a period of "freewheeling" when no retarding forces act on the wheel. During this time the wheel cannot contribute any differential force to effect the turn. The ensuing delay results in poor operator feedback and leads to diminished confidence on the part of the operator, making it difficult to run the vehicle at high road speeds. There is clearly an opportunity to improve turning performance of differentially steered vehicles by using active braking.

SUMMARY

The invention concerns a differentially steered vehicle. In one example embodiment the vehicle comprises a chassis having an engine and a plurality of wheels mounted thereon including a left wheel and a right wheel disposed on opposite sides of the vehicle. A left brake is operatively associated with the left wheel. A right brake is operatively associated with the right wheel. A left hydraulic motor is mounted on the chassis and is operatively associated with the left wheel. A right hydraulic motor is mounted on the chassis and is operatively associated with the right wheel. A left hydraulic pump is mounted on the chassis and driven by the engine. The left hydraulic pump is operatively associated with the left hydraulic motor. A right hydraulic pump is mounted on the chassis and is driven by the engine. The right hydraulic pump is operatively associated with the right hydraulic motor. a steering control is mounted on the chassis. The steering control is manually movable and adapted to steer the vehicle by causing different torques to be applied to the left and right wheels. A controller is mounted on the chassis. A steering control position sensor is in communication with the controller for measuring a position of the steering control and sending signals indicative of the position to the controller. A left brake actuator is in communication with the controller for applying and releasing the left brake. A right brake actuator is in communication with the controller for applying and releasing the right brake. The controller is adapted to receive signals indicative of the steering control position sensor and to apply the left or the right brake using the left and right brake actuators pursuant to a control method executed by the controller.

In an example embodiment the left hydraulic motor has a left drive port and a left return port, and the left hydraulic pump provides hydraulic fluid to the left drive port and receives hydraulic fluid from the left return port. Further by way of example the right hydraulic motor has a right drive port and a right return port, and the right hydraulic pump provides hydraulic fluid to the right drive port and receives hydraulic fluid from the right return port. A left pressure sensor is in communication with the controller. The left pressure sensor measures a difference in left fluid pressure across the left hydraulic motor and sends signals indicative of the difference in left fluid pressure to the controller. A right pressure sensor is in communication with the controller. The right pressure sensor measures a difference in right fluid pressure across the right hydraulic motor and sends signals indicative of the difference in right fluid pressure to the controller. The controller is adapted to receive the signals indicative of the difference in the left fluid pressure and the right fluid pressure and to apply the left or the right brake using the left and right brake actuators pursuant to a control method executed by the controller.

In an example embodiment the left pressure sensor is adapted to measure the difference in left fluid pressure between the left drive port and the left return port, and the right pressure sensor is adapted to measure the difference in right fluid pressure between the right drive port and the right return port. An example vehicle may further comprise a left speed sensor adapted to measure a rotational speed of the left wheel and send signals indicative thereof to the controller, and a right speed sensor adapted to measure a rotational speed of the right wheel and send signals indicative thereof to the controller. The controller is adapted to receive the signals indicative of the rotational speed of the left wheel and the rotational speed of the right wheel and to apply the left or the right brake using the left and right brake actuators pursuant to a control method executed by the controller.

In a particular example embodiment the vehicle comprises a tractor. In another example embodiment the vehicle comprises a harvester. By way of example the brakes may be selected from the group consisting of disc brakes, drum brakes, band brakes and electronic particle brakes. Further by way of example the steering control comprises a steering wheel. In an example embodiment the brake actuators are selected from the group consisting of hydraulic actuators, pneumatic actuators and electrical actuators.

The invention encompasses a method of steering a differentially steered vehicle. The vehicle has a left wheel and a right wheel disposed on opposite sides thereof. An example embodiment of a method comprises:

measuring a position of a steering control;
    determining a direction of turn of the vehicle in response to the position of the steering control;
    applying a braking force to one of the wheels of the vehicle located on an inside of the direction of the turn.

An example method may further comprise adjusting a magnitude of the braking force in proportion to the position of the steering control.

An example method may further comprise:
    measuring a rotational speed of the wheels;
    adjusting a magnitude of the braking force in proportion to the rotational speed of the one wheel located on the inside of the direction of the turn.

In an example embodiment wherein the left wheel is turned by a left hydraulic motor and the right wheel is turned by a right hydraulic motor, an example method may further comprise:
    measuring a difference in hydraulic fluid pressure across the left hydraulic motor;
    measuring a difference in hydraulic fluid pressure across the right hydraulic motor;
    comparing the difference in hydraulic fluid pressure across the left hydraulic motor with a threshold pressure difference;

comparing the difference in hydraulic fluid pressure across the right hydraulic motor with the threshold pressure difference;

applying the braking force to the left wheel if the difference in hydraulic fluid pressure between the left drive port and the left return port is less than the threshold pressure difference;

applying the braking force to the right wheel if the difference in hydraulic fluid pressure between the right drive port and the right return port is less than the threshold pressure difference.

An example method may further comprise:

adjusting a magnitude of the braking force applied to the left wheel in proportion to the difference in hydraulic fluid pressure across the left hydraulic motor;

adjusting a magnitude of the braking force applied to the right wheel in proportion to the difference in hydraulic fluid pressure across the right hydraulic motor.

The invention further comprises a differentially steered vehicle. In one example embodiment the vehicle comprises a chassis having an engine and a plurality of wheels mounted thereon including a left wheel and a right wheel disposed on opposite sides of the vehicle. A left brake is operatively associated with the left wheel and a right brake is operatively associated with the right wheel. A left hydraulic motor is mounted on the chassis and is operatively associated with the left wheel. The left hydraulic motor has a left drive port and a left return port. A right hydraulic motor is mounted on the chassis and is operatively associated with the right wheel. The right hydraulic motor has a right drive port and a right return port. A left hydraulic pump is mounted on the chassis and is driven by the engine. The left hydraulic pump provides hydraulic fluid to the left drive port and receives the hydraulic fluid from the left return port of the left hydraulic motor. A right hydraulic pump is mounted on the chassis and is driven by the engine. The right hydraulic pump provides hydraulic fluid to the right drive port and receives the hydraulic fluid from the right return port of the right hydraulic motor. A controller is mounted on the chassis. A left brake actuator is in communication with the controller for applying and releasing the left brake, and a right brake actuator is in communication with the controller for applying and releasing the right brake. A left pressure sensor is in communication with the controller. The left pressure sensor measures a difference in left fluid pressure across the left hydraulic motor and sends signals indicative of the difference in left fluid pressure to the controller. A right pressure sensor is in communication with the controller. The right pressure sensor measures a difference in right fluid pressure across the right hydraulic motor and sends signals indicative of the difference in right fluid pressure to the controller. The controller is adapted to receive signals indicative of the difference in the left fluid pressure and the right fluid pressure and to apply the left or the right brake using the left and right brake actuators pursuant to a control method executed by the controller.

In one example embodiment the vehicle comprises a tractor. In another example embodiment the vehicle comprises a harvester.

The invention also encompasses a method of steering a differentially steered vehicle, the vehicle having a left wheel and a right wheel disposed on opposite sides thereof, the left wheel being turned by a left hydraulic motor and the right wheel being turned by a right hydraulic motor. In an example embodiment the method comprises:

measuring a difference in hydraulic fluid pressure across the left hydraulic motor;

measuring a difference in hydraulic fluid pressure across the right hydraulic motor;

comparing the difference in hydraulic fluid pressure across the left hydraulic motor with a threshold pressure difference;

comparing the difference in hydraulic fluid pressure across the right hydraulic motor with the threshold pressure difference;

applying the braking force to the left wheel if the difference in hydraulic fluid pressure across the left hydraulic motor is less than the threshold pressure difference;

applying the braking force to the right wheel if the difference in hydraulic fluid pressure across the right hydraulic motor is less than the threshold pressure difference.

An example method may further comprise:

adjusting a magnitude of the braking force applied to the left wheel in proportion to the difference in hydraulic fluid pressure across the left hydraulic motor;

adjusting a magnitude of the braking force applied to the right wheel in proportion to the difference in hydraulic fluid pressure across the right hydraulic motor.

The invention also encompasses a differentially steered vehicle. By way of example the vehicle comprises a chassis having an engine and a plurality of wheels mounted thereon including a left wheel and a right wheel disposed on opposite sides of the vehicle. A left brake is operatively associated with the left wheel, and a right brake is operatively associated with the right wheel. A left hydraulic motor is mounted on the chassis and is operatively associated with the left wheel. A right hydraulic motor is mounted on the chassis and is operatively associated with the right wheel. A left hydraulic pump is mounted on the chassis and is driven by the engine. The left hydraulic pump is operatively associated with the left hydraulic motor. A right hydraulic pump is mounted on the chassis and is driven by the engine. The right hydraulic pump is operatively associated with the right hydraulic motor. A controller is mounted on the chassis. A left brake actuator is in communication with the controller for applying and releasing the left brake, and a right brake actuator is in communication with the controller for applying and releasing the right brake. A left speed sensor is adapted to measure a rotational speed of the left wheel and send signals indicative thereof to the controller, and a right speed sensor is adapted to measure a rotational speed of the right wheel and send signals indicative thereof to the controller. The controller is adapted to receive the signals indicative of the rotational speed of the left wheel and the rotational speed of the right wheel and to apply the left or the right brake using the left and right brake actuators pursuant to a control method executed by the controller.

In one example embodiment the vehicle comprises a tractor. In another example embodiment the vehicle comprises a harvester.

The invention further encompasses a method of steering a differentially steered vehicle, the vehicle having a left wheel and a right wheel disposed on opposite sides thereof. In an example embodiment the method comprises:

measuring a rotational speed of each of the wheels;

comparing the rotational speed of each of the wheels;

applying a braking force to a slower one of the wheels.

An example embodiment may further comprise:

adjusting a magnitude of the braking force in proportion to the rotational speed of the slower one of the wheels.

DETAILED DESCRIPTION

Figure 1:
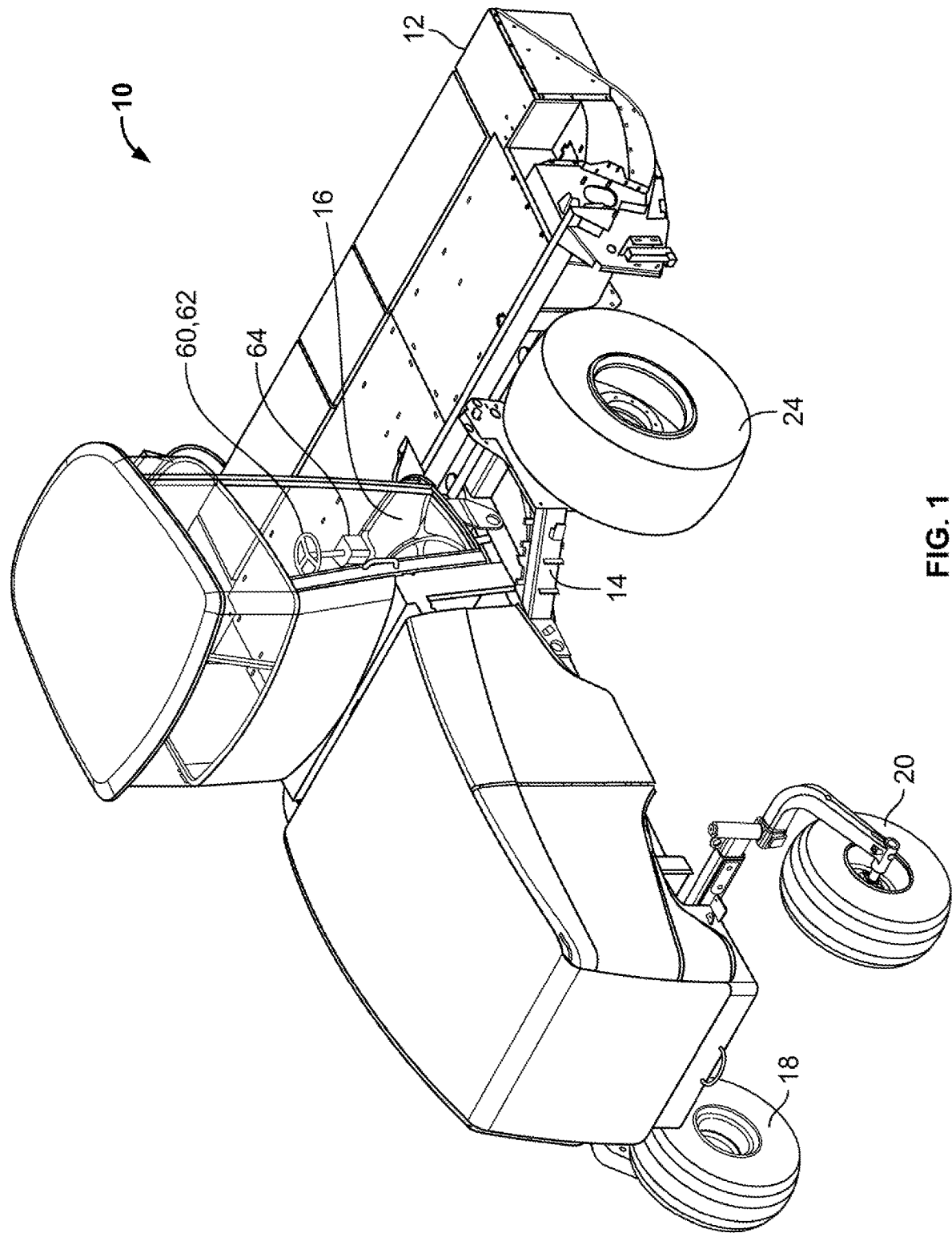
FIG. 1 is an isometric view of an example vehicle according to the invention.
Figure 2:
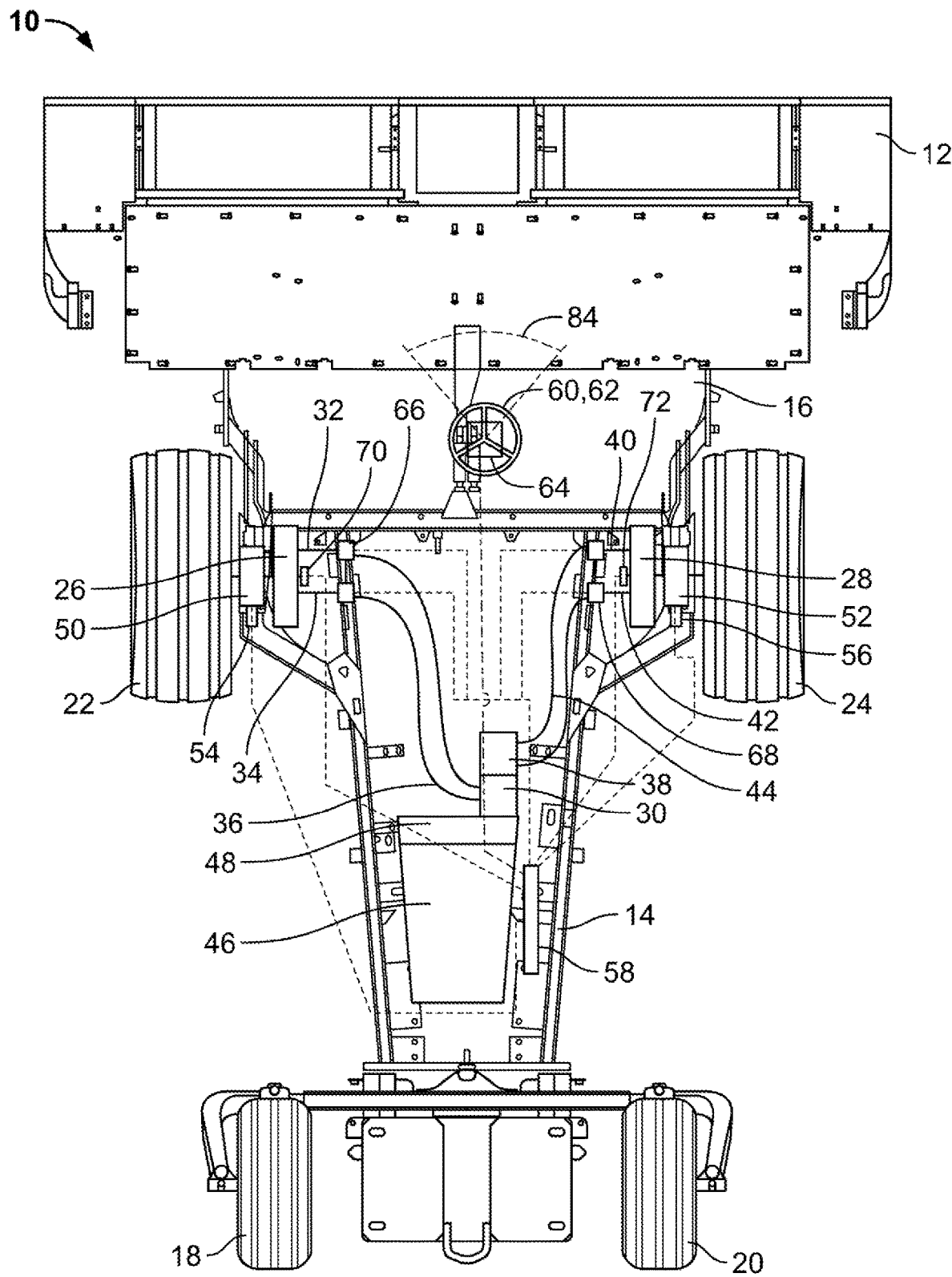
FIG. 2 is a plan view of the chassis and selected internal components of the vehicle shown in FIG. 1.

FIG. 1 shows an example differentially steered vehicle 10 having a steering and braking system according to the invention. Such vehicles include harvesters such as self-propelled windrowers having a header 12 (shown) for cutting crop, as well as mowers, spreaders, windrow inverters, tractors and tracked vehicles. As shown in FIG. 2 vehicle 10 comprises a chassis 14 on which a control cab 16 is mounted. A plurality of wheels are mounted on chassis 14, the wheels including freely castoring rear wheels 18 and 20 and respective left and right front wheels 22 and 24 disposed on opposite sides of the vehicle 10. A left hydraulic motor 26 is mounted on chassis 14 and is operatively associated with the left wheel 22, applying torque thereto and thereby driving the left wheel. Similarly, a right hydraulic motor 28 is mounted on chassis 14 and is operatively associated with the right wheel 24, applying torque thereto and thereby driving the right wheel.

A left hydraulic pump 30 is mounted on the chassis 14 and is operatively associated with the left hydraulic motor 26, supplying hydraulic fluid under pressure to drive the left motor. The left hydraulic motor 26 has a left drive port 32 and a left return port 34, both ports being in fluid communication with the left pump 30 via hydraulic lines 36. Hydraulic fluid under high pressure is delivered to the left drive port 32 and returned to the left pump 30 at a lower pressure through the left return port 34. Similarly, a right hydraulic pump 38 is mounted on the chassis 14 and is operatively associated with the right hydraulic motor 28, supplying hydraulic fluid under pressure to drive the right motor. The right hydraulic motor 28 has a right drive port 40 and a right return port 42, both ports being in fluid communication with the right pump 38 via respective hydraulic lines 44. Hydraulic fluid under high pressure is delivered to the right drive port 40 and returned to the right pump 38 at a lower pressure through the right return port 42. Both the left and right hydraulic pumps 30 and 38 are driven by a chassis mounted engine 46 via a gearbox 48. Engine 46 may be a diesel engine, a gasoline engine or an electrical motor.

A left brake 50 is operatively associated with the left wheel 22 and a right brake 52 is operatively associated with the right wheel 24. Brakes 50 and 52 may comprise, for example, disc brakes, drum brakes, band brakes and electronic particle brakes to cite some examples. Left and right brakes 50 and 52 are applied and released respectively to left and right wheels 22 and 24 by respective left and right brake actuators 54 and 56 under the control of a controller 58 mounted on the chassis 14. In a practical design actuators 54 and 56 may comprise hydraulic, pneumatic or electric actuators. Controller 58 advantageously comprises a microprocessor, and may be, for example, a programmable logic controller running resident software executing algorithms according to an example method of the invention as described below.

In one example embodiment of a steering and braking system according to the invention a steering control 60 is mounted in control cab 16 on chassis 14 (see also FIG. 1). An example steering control 60 comprises a steering wheel 62. Steering control 60 is manually movable (turned in this example) by the operator to effect differential steering of vehicle 10 by applying more torque to one of wheels 22, 24 than the other, the vehicle turning the direction of the wheel having less applied torque. A steering control position sensor 64, such as a rotary encoder, measures the position of the steering control 60 (e.g., the angular position of wheel 62) and sends a signal indicative of the position to the controller 58. Controller 58 is adapted to receive such signals and in response: 1) apply increased torque to one of the wheels 22, 24 and decreased torque to the other via control of the left and right hydraulic pumps 30 and 38, as appropriate to steer vehicle 10 in the desired direction; and 2) apply the left or right brake 50, 52 via the appropriate left and right brake actuators 54, 56, pursuant to a control method (described below) to slow the wheel on the inside of the turn (the wheel for which torque is reduced) and inhibit or prevent freewheeling.

FIG. 2 illustrates another example steering and braking system which can be used on vehicle 10, either alone or in conjunction with the steering control position sensor 64, to apply brakes 50 and 52 pursuant to a method according to the invention. In this system, vehicle 10 comprises a left pressure sensor 66 in communication with controller 58. Left pressure sensor 66 measures the difference in hydraulic fluid pressure across the left hydraulic motor 26. This is conveniently accomplished by measuring the pressure difference between the left drive port 32 and the left return port 34 of the left hydraulic motor 26 (i.e., the pressure drop across the left motor). The left pressure sensor 66 sends signals indicative of this measured "left fluid pressure difference" to the controller 58. Similarly, a right pressure sensor 68 is in communication with controller 58. Right pressure sensor 68 measures the difference in hydraulic fluid pressure across the right hydraulic motor 28. Again, this measurement is conveniently made between the right drive port 40 and the right return port 42 of the right hydraulic motor 28 (i.e. the pressure drop across the right motor). The right pressure sensor 68 sends signals indicative of the measured "right fluid pressure difference" to the controller 58. In this example system the controller 58 is adapted to receive the pressure difference signals from the left and right pressure sensors 66 and 68 and apply the left or right brake 50 or 52 in response using respective actuators 54 and 56 pursuant to a control method according to the invention executed by the controller 58.

As further shown in FIG. 2, another steering and braking system comprises a left speed sensor 70 and a right speed sensor 72 mounted on the vehicle 10. The speed sensors 70 and 72 are in communication with the controller 58 and respectively measure the rotational speed of left and right wheels 22 and 24. The speed sensors 70 and 72 send signals indicative of the wheel rotational speeds to the controller 58, which is adapted to receive the signals and apply the left and right brakes 50 and 52 in response pursuant to a control method executed by the controller 58.

The invention encompasses three methods of active braking to improve steering of a differentially steered vehicle by providing increased directional control, stability, responsiveness and operator confidence. Each of the methods described below may be employed alone or in any combination. Although the methods are described with reference to the vehicle 10, it is understood that they may be applied to any vehicle which uses differential steering.

Figure 3:
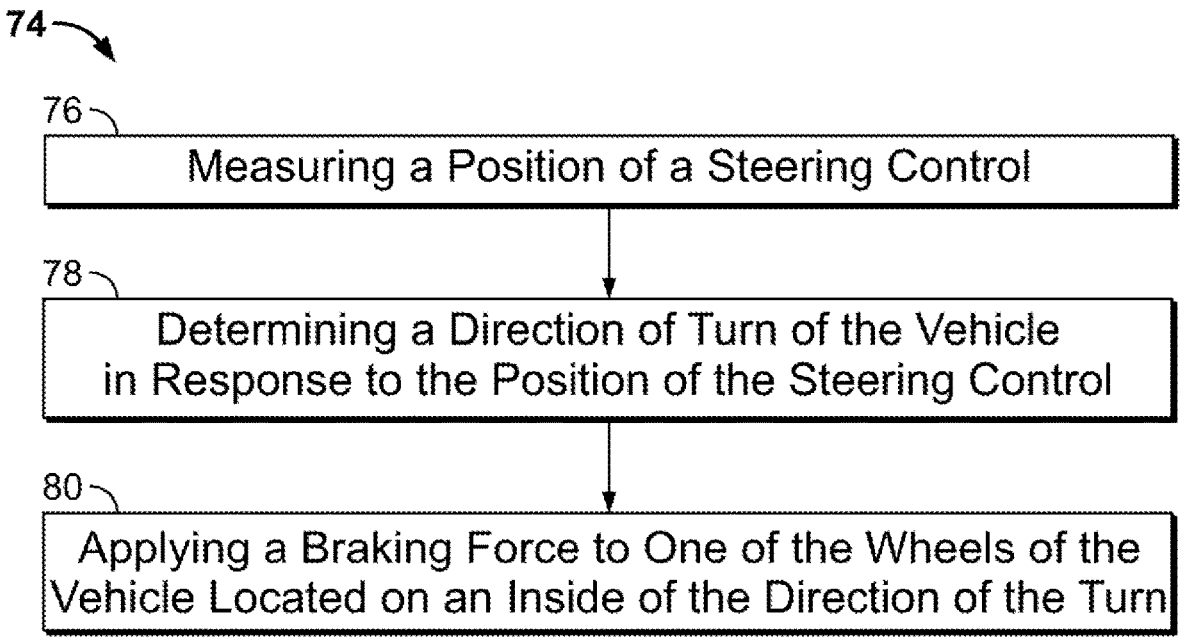
FIG. 3 is a block diagram illustrating an example steering and braking method according to the invention.
Figure 4:
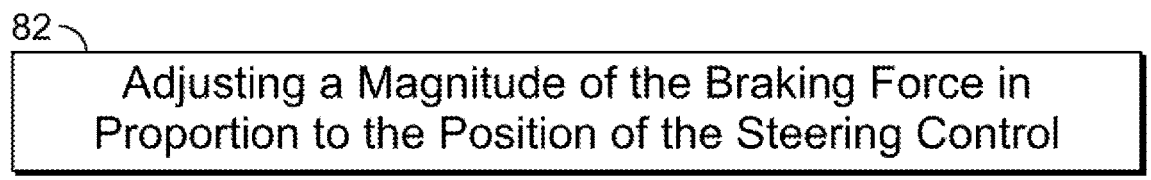
FIG. 4 is a block diagram illustrating additional steps which can be used with the method shown in FIG. 3.

FIG. 3 provides a flow chart which illustrates an example embodiment of a method 74 of using active braking during steering of a differentially steered vehicle 10 shown in FIG. 2. This method comprises:

- measuring a position of a steering control (76);
- determining a direction of turn of the vehicle in response to the position of the steering control (78); and
- applying a braking force to one of the wheels of the vehicle located on an inside of the direction of the turn (80).

This method according to the invention may further comprise adjusting a magnitude of the braking force in proportion to the position of the steering control (82), for example, applying a greater braking force when the position of the steering control calls for a tight turn.

The method 74 may be executed using vehicle 10 as shown with reference to FIGS. 2 and 3. When an operator turns the steering wheel 62 to the left to perform a left turn the steering control position sensor 64 measures the position of the steering control (step 76) and sends signals indicative of the measured position to the controller 58. The steering control position in this example could be the angular displacement 84 of the steering wheel 62, measured by a rotary encoder for example. Controller 58, adapted to receive such signals, executes its programmed algorithms in response by determining the direction of the turn (step 78), increasing the torque applied to the right wheel 24 and decreasing the torque applied to the left wheel 22, causing the vehicle 10 to turn to the left. In the absence of any braking, the left wheel 22 on the inside of the left turn will freewheel for a time as the applied torque diminishes before the wheel slows to the required speed to help effect the turn. This freewheeling effect diminishes vehicle responsiveness and can cause instability of the steering controls. However, the controller 58 counteracts this adverse effect by signaling the left brake actuator 54 to apply a braking force (step 80) to the left wheel 22, thereby preventing freewheeling and increasing the turn response and steering stability. It is thought advantageous to adjust the applied braking force (step 82) as a function of the angular displacement 84 of the steering wheel 62, for example, adjusting the magnitude of the braking force in proportion to the angular displacement 84. This step will make the braking proportional to the turn rate by applying more braking force for a tighter turn and thereby improve the responsiveness of the vehicle 10.

Figure 5:
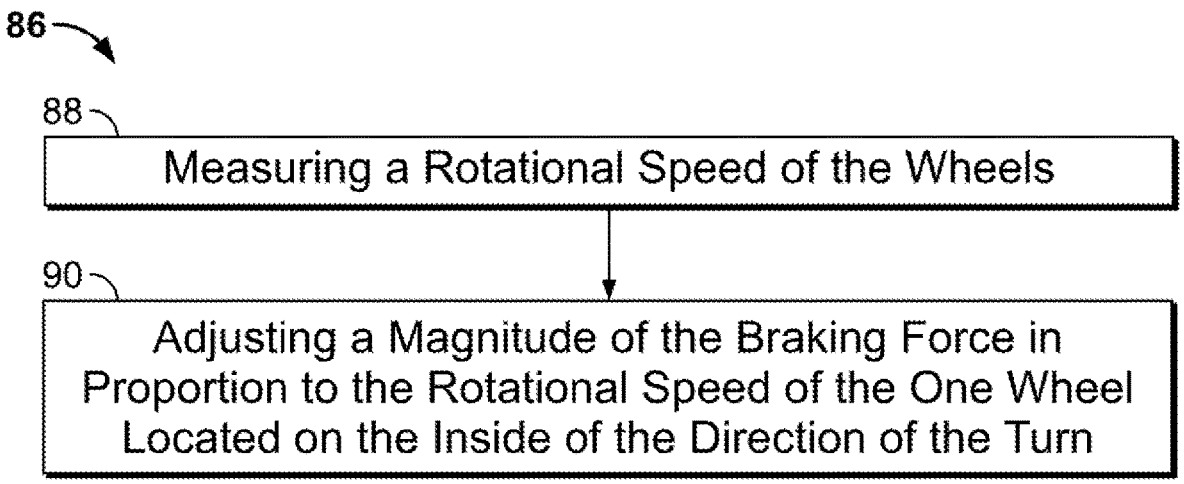
FIG. 5 is a block diagram illustrating an example steering and braking method according to the invention.

Another example steering/braking method 86 is illustrated in FIG. 5 and can be used alone or as a refinement in conjunction with method 74. Example method 86 comprises:

- measuring a rotational speed of the wheels (88); and
- adjusting a magnitude of the braking force in proportion to the rotational speed of the one wheel located on the inside of the direction of the turn (90).

Again using vehicle 10 (FIG. 2) executing a left turn by way of example, the left and right speed sensors 70 and 72 measure the rotational speed (step 88) of the left and right wheels 22 and 24 and send signals indicative of the rotational speeds to the controller 58. During a turn, the controller uses the measured speed of the wheel on the inside of the turn (in this example, left wheel 22) to adjust the magnitude of the braking force applied to that wheel as a function of its rotational speed. Using the speed sensors 70 and 72 to adjust the braking force increases vehicle responsiveness because it allows the control system to take the mass moment of inertia of the rotating wheel into account to effect braking, with more braking force required to slow a faster turning wheel.

Figure 6:
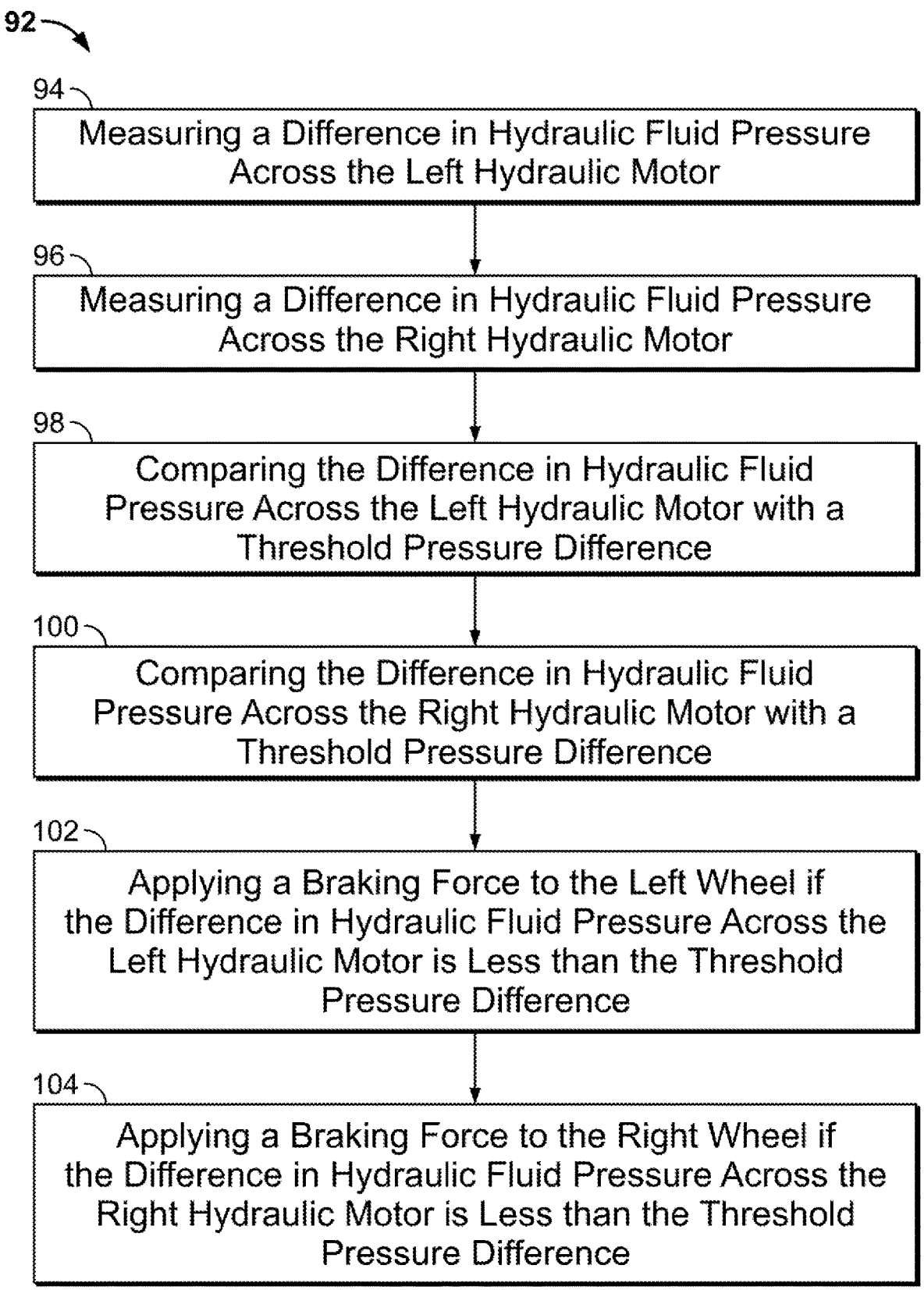
FIG. 6 is a block diagram illustrating an example steering and braking method according to the invention.

Another example braking/steering method 92 is illustrated in FIG. 6, and comprises:

- measuring a difference in hydraulic fluid pressure across the left hydraulic motor (94);
- measuring a difference in hydraulic fluid pressure across the right hydraulic motor (96);
- comparing the difference in hydraulic fluid pressure across the left hydraulic motor with a threshold pressure difference (98);
- comparing the difference in hydraulic fluid pressure across the right hydraulic motor with the threshold pressure difference (100);
- applying a braking force to the left wheel if the difference in hydraulic fluid pressure across the left hydraulic motor is less than the threshold pressure difference (102);
- applying a braking force to the right wheel if the difference in hydraulic fluid pressure across the right hydraulic motor is less than the threshold pressure difference (104).

Figure 7:
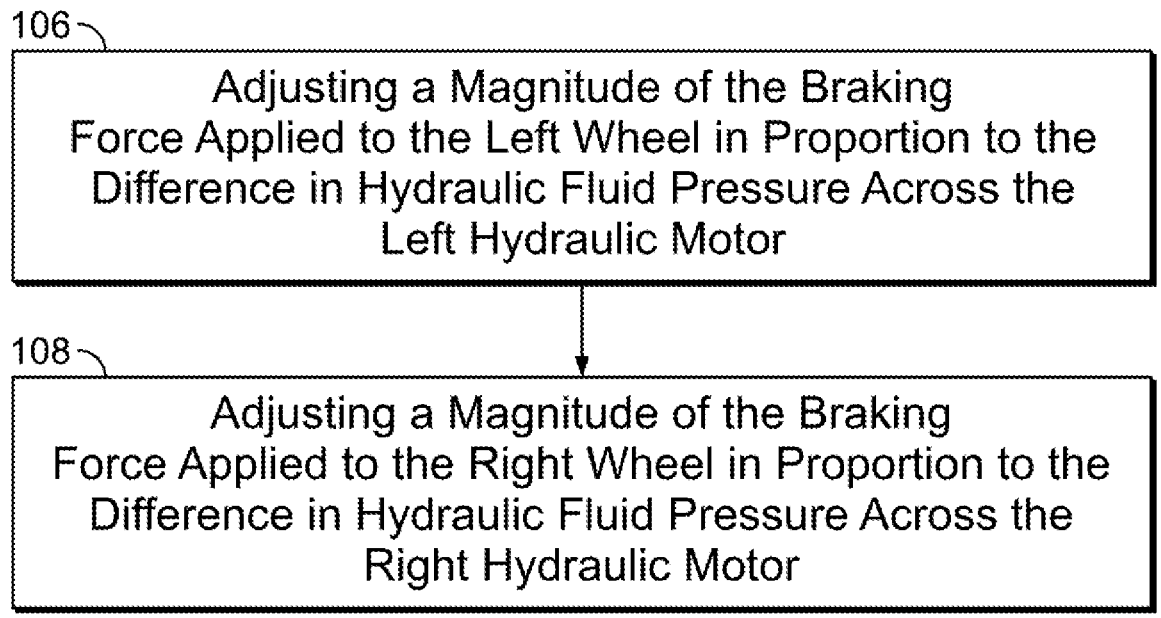
FIG. 7 is a block diagram illustrating additional steps which can be used with the method shown in FIG. 6.

Method 92 may be used alone or in conjunction with methods 74 and 86 to improve steering of a differentially steered vehicle. Using vehicle 10 of FIG. 2 in a left turn again as illustrative, execution of method 92 involves the left and right pressure sensors 66 and 68 measuring the respective hydraulic fluid pressure differences across the left and right hydraulic motors 26 and 28. It is convenient to measure the pressure differences across the left hydraulic motor 26 between the left drive port 32 and the left return port 34 and the pressure differences across the right hydraulic motor 28 between the right drive port 40 and the right return port 42. During a left turn, the difference in hydraulic pressure across the left hydraulic motor 26 as measured by pressure sensor 66 (step 94) will fall, as less torque is applied to the left wheel 22 when controller 58 reduces the hydraulic fluid flow from the left hydraulic pump 30 to effect the left turn. Pressure sensor 66 sends signals to the controller 58 indicative of the pressure difference and when it falls below a predetermined threshold value (which may indicate freewheeling of the left wheel) as determined in the comparison step 98 the controller signals the left brake actuator 54 to apply a braking force to the left wheel to stabilize the turn and increase vehicle responsiveness. FIG. 7 shows additional steps which can be used in method 92, comprising:

- adjusting a magnitude of the braking force applied to the left wheel in proportion to the difference in hydraulic fluid pressure across the left hydraulic motor (106);
- adjusting a magnitude of the braking force applied to the right wheel in proportion to the difference in hydraulic fluid pressure across the right hydraulic motor (108).

It is understood for the braking/steering methods 74, 86 and 92 described herein, execution of a right turn will proceed similarly to that as illustrated for a left turn, with the left and right components and actions reversed. Furthermore, the method 92 may also find use in enhancing steering control and stability when a differentially steered vehicle 10 transitions from running along flat terrain to running downhill. During such a transition, freewheeling occurs which may result in an unsettling instability of the steering controls. It would be advantageous to apply braking force to the powered wheels 22 and 24 during the period of freewheeling to eliminate any steering instability and thereby enhance responsiveness and operator confidence.

What is claimed is:

1. A differentially steered vehicle, said vehicle comprising:
   a chassis having an engine and a plurality of wheels mounted thereon including a left wheel and a right wheel disposed on opposite sides of said vehicle;
   a left brake operatively associated with said left wheel;
   a right brake operatively associated with said right wheel;
   a left hydraulic motor mounted on said chassis and operatively associated with said left wheel;
   a right hydraulic motor mounted on said chassis and operatively associated with said right wheel;
   a left hydraulic pump mounted on said chassis and driven by said engine, said left hydraulic pump operatively associated with said left hydraulic motor;
   a right hydraulic pump mounted on said chassis and driven by said engine, said right hydraulic pump operatively associated with said right hydraulic motor;
   a steering control mounted on said chassis, said steering control being manually movable and adapted to steer said vehicle by causing different torques to be applied to said left and right wheels;
   a controller mounted on said chassis;
   a steering control position sensor in communication with said controller for measuring a position of said steering control and sending signals indicative of said position to said controller;
   a left brake actuator in communication with said controller for applying and releasing said left brake;
   a right brake actuator in communication with said controller for applying and releasing said right brake;
       said left hydraulic motor has a left drive port and a left return port, said left hydraulic pump providing hydraulic fluid to said left drive port and receiving said hydraulic fluid from said left return port;
   said right hydraulic motor has a right drive port and a right return port, said right hydraulic pump providing said hydraulic fluid to said right drive port and receiving said hydraulic fluid from said right return port;
   a left pressure sensor in communication with said controller, said left pressure sensor for measuring a difference in left fluid pressure across said left hydraulic motor and sending signals indicative of said difference in left fluid pressure to said controller;
   a right pressure sensor in communication with said controller, said right pressure sensor for measuring a difference in right fluid pressure across said right hydraulic motor and sending signals indicative of said difference in right fluid pressure to said controller; wherein
   said controller is adapted to receive said signals indicative of said steering control position sensor and to apply said left or said right brake using said left and right brake actuators pursuant to control instructions executed by said controller; and said controller is further adapted to receive said signals indicative of said difference in said left fluid pressure and said right fluid pressure and to apply said left or said right brake using said left and right brake actuators pursuant to control instructions executed by said controller.

2. The differentially steered vehicle according to claim 1, wherein:
   said left pressure sensor is adapted to measure said difference in left fluid pressure between said left drive port and said left return port;
   said right pressure sensor is adapted to measure said difference in right fluid pressure between said right drive port and said right return port.

3. The differentially steered vehicle according to claim 1, further comprising:
   a left speed sensor adapted to measure a rotational speed of said left wheel and send signals indicative thereof to said controller;
   a right speed sensor adapted to measure a rotational speed of said right wheel and send signals indicative thereof to said controller; wherein
   said controller is adapted to receive said signals indicative of said rotational speed of said left wheel and said rotational speed of said right wheel and to apply said left or said right brake using said left and right brake actuators pursuant to a control instructions executed by said controller.

4. The differentially steered vehicle according to claim 1, wherein said vehicle comprises a tractor.

5. The differentially steered vehicle according to claim 1, wherein said vehicle comprises a harvester.

6. The differentially steered vehicle according to claim 1, wherein said brakes are selected from the group consisting of disc brakes, drum brakes, band brakes and electronic particle brakes.

7. The differentially steered vehicle according to claim 1, wherein said steering control comprises a steering wheel.

8. The differentially steered vehicle according to claim 1, wherein said brake actuators are selected from the group consisting of hydraulic actuators, pneumatic actuators and electrical actuators.

9. A method of steering a differentially steered vehicle, said vehicle having a left wheel and a right wheel disposed on opposite sides thereof wherein said left wheel is turned by a left hydraulic motor and said right wheel is turned by a right hydraulic motor, said method comprising:
   measuring a position of a steering control;
   determining a direction of turn of said vehicle in response to said positon of said steering control;
   applying a braking force to one of said wheels of said vehicle located on an inside of said direction of said turn;
   measuring a difference in hydraulic fluid pressure across said left hydraulic motor;
   measuring a difference in hydraulic fluid pressure across said right hydraulic motor;
   comparing said difference in hydraulic fluid pressure across said left hydraulic motor with a threshold pressure difference;
   comparing said difference in hydraulic fluid pressure across said right hydraulic motor with said threshold pressure difference;
   applying said braking force to said left wheel if said difference in hydraulic fluid pressure between said left drive port and said left return port is less than said threshold pressure difference;
   applying said braking force to said right wheel if said difference in hydraulic fluid pressure between said right drive port and said right return port is less than said threshold pressure difference.

10. The method according to claim 9, further comprising adjusting a magnitude of said braking force in proportion to said position of said steering control.

11. The method according to claim 9, further comprising:
   measuring a rotational speed of said wheels;

adjusting a magnitude of said braking force in proportion to said rotational speed of said one wheel located on said inside of said direction of said turn.

12. The method according to claim 9, further comprising:
adjusting a magnitude of said braking force applied to said left wheel in proportion to said difference in hydraulic fluid pressure across said left hydraulic motor;
adjusting a magnitude of said braking force applied to said right wheel in proportion to said difference in hydraulic fluid pressure across said right hydraulic motor.

13. A differentially steered vehicle, said vehicle comprising:
a chassis having an engine and a plurality of wheels mounted thereon including a left wheel and a right wheel disposed on opposite sides of said vehicle;
a left brake operatively associated with said left wheel;
a right brake operatively associated with said right wheel;
a left hydraulic motor mounted on said chassis and operatively associated with said left wheel, said left hydraulic motor having a left drive port and a left return port;
a right hydraulic motor mounted on said chassis and operatively associated with said right wheel, said right hydraulic motor having a right drive port and a right return port;
a left hydraulic pump mounted on said chassis and driven by said engine, said left hydraulic pump providing hydraulic fluid to said left drive port and receiving said hydraulic fluid from said left return port of said left hydraulic motor;
a right hydraulic pump mounted on said chassis and driven by said engine, said right hydraulic pump providing said hydraulic fluid to said right drive port and receiving said hydraulic fluid from said right return port of said right hydraulic motor;
a controller mounted on said chassis;
a left brake actuator in communication with said controller for applying and releasing said left brake;
a right brake actuator in communication with said controller for applying and releasing said right brake;
a left pressure sensor in communication with said controller, said left pressure sensor for measuring a difference in left fluid pressure across said left hydraulic motor and sending signals indicative of said difference in left fluid pressure to said controller;
a right pressure sensor in communication with said controller, said right pressure sensor for measuring a difference in right fluid pressure across said right hydraulic motor and sending signals indicative of said difference in right fluid pressure to said controller; wherein
said controller is adapted to receive said signals indicative of said difference in said left fluid pressure and said right fluid pressure and to apply said left or said right brake using said left and right brake actuators pursuant to control instructions by said controller.

14. The differentially steered vehicle according to claim 13, wherein said vehicle comprises a tractor.

15. The differentially steered vehicle according to claim 14, wherein said vehicle comprises a harvester.

16. A method of steering a differentially steered vehicle, said vehicle having a left wheel and a right wheel disposed on opposite sides thereof, said left wheel being turned by a left hydraulic motor and said right wheel being turned by a right hydraulic motor, said method comprising:
measuring a difference in hydraulic fluid pressure across said left hydraulic motor;
measuring a difference in hydraulic fluid pressure across said right hydraulic motor;
comparing said difference in hydraulic fluid pressure across said left hydraulic motor with a threshold pressure difference;
comparing said difference in hydraulic fluid pressure across said right hydraulic motor with said threshold pressure difference;
applying said braking force to said left wheel if said difference in hydraulic fluid pressure across said left hydraulic motor is less than said threshold pressure difference;
applying said braking force to said right wheel if said difference in hydraulic fluid pressure across said right hydraulic motor is less than said threshold pressure difference.

17. The method according to claim 16, further comprising:
adjusting a magnitude of said braking force applied to said left wheel in proportion to said difference in hydraulic fluid pressure across said left hydraulic motor;
adjusting a magnitude of said braking force applied to said right wheel in proportion to said difference in hydraulic fluid pressure across said right hydraulic motor.

* * * * *